Jan. 3, 1956  F. BRENNER  2,729,437
APPARATUS FOR MAKING CAVITIES FOR PIPES, ELECTRIC
WIRING AND SWITCHES IN THE MASONRY
OF HOUSES AND THE LIKE
Filed July 23, 1951
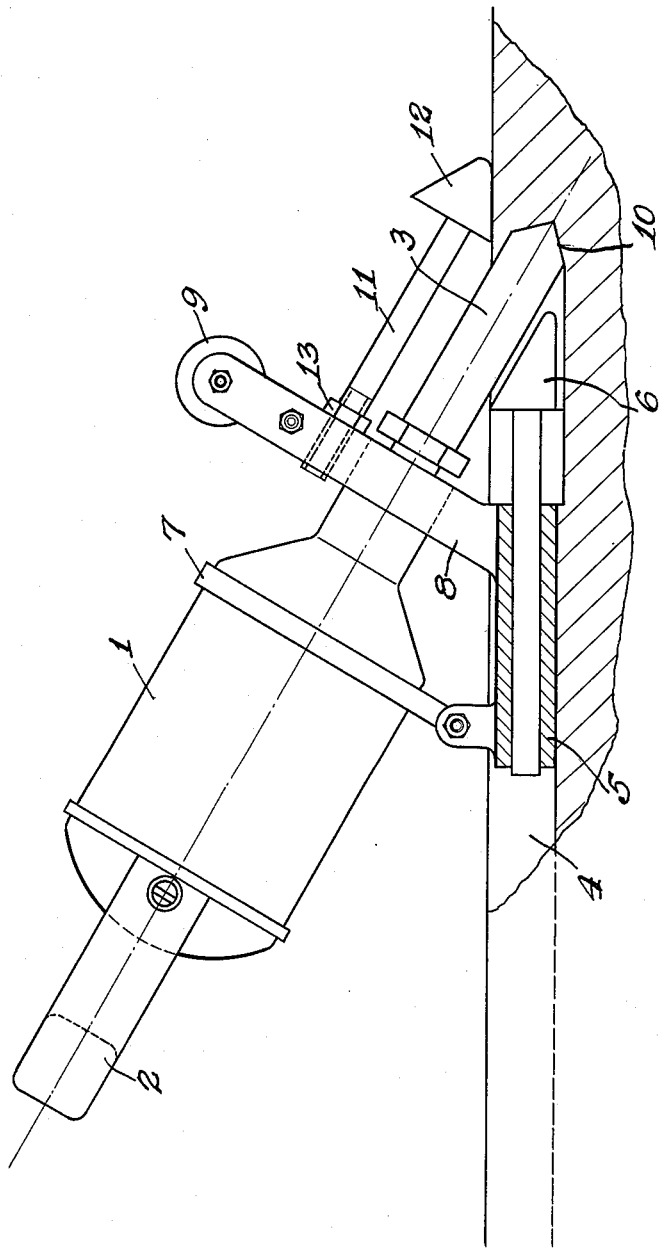
Inventor
F. Brenner
By Glascock Downing Seebold
Attys.

United States Patent Office 2,729,437
Patented Jan. 3, 1956

2,729,437

APPARATUS FOR MAKING CAVITIES FOR PIPES, ELECTRIC WIRING AND SWITCHES IN THE MASONRY OF HOUSES AND THE LIKE

Franz Brenner, Ansbach, Germany, assignor to Ansbacher Maschinen- und Werkzeugbau Gesellschaft mit beschrankter Haftung, Ansbach, Germany Application July 23, 1951, Serial No. 238,091

Claims priority, application Germany July 28, 1950

1 Claim. (Cl. 262—8)

In the last few decades it has become usual to place fittings and installations inside the masonry of residential, commercial and factory premises. For this purpose, on completion of the bare brickwork of the house, and later also if necessary, grooves and cavities are cut in the wall which heretofore have been produced only by the hammering action of a suitable manually or mechanically operated tool. This is obviously troublesome and costly and not infrequently leads to large breaks in the masonry which then have to be subsequently repaired with cement or the like, with considerable trouble.

The invention proposes to remedy this disadvantage by means of a wall milling cutter which in the form of a simple, convenient and preferably electrically driven device is applied to the wall and fed or advanced in accordance with the desired cavity or groove. The tool of the wall milling cutter will preferably consist of a simple conically pointed or twist drill which is applied to the wall with the its drill shaft inclined thereto and on reaching a certain boring depth is moved along the wall. Guiding at the selected boring depth will be effected by a suitable device sliding either on the wall surface or in the bored groove itself.

An embodiment of the invention is illustrated in the accompanying drawing which shows a side view of the drilling machine with rotary grooving cutter, and clamping member securing the guiding member and centering support to the drill in position for cutting a groove in a masonry structure.

Referring now, more particularly, to the drawing there is provided an electric hand drilling machine 1, which is applied with its handle 2 and drill 3 inclined to the plane of the wall. In the wall, there is already a short previously worked groove 4, in which a guiding member 5 of the hand drilling machine is laid. This guiding member 5 is provided with a displaceable guiding head 6 which is inclined to the axis of the drill. The guiding member 5 is attached to the drill head by means of a further rigid arm 8 formed as a clamp or collar. On the opposite side of the drill head, the arm 8 is bifurcated and carries there an additional handle 9 by means of which the tool can be easily and safely manipulated and guided in the direction of forward movement or feed.

The manner of operation of this apparatus during the milling of grooves is obvious from the description. When a small length of groove has been made by means of the drill 3, the head 6 of the guiding body 5 is laid in this groove, and the result is a completely positive automatic guiding of the tool. During the further treatment of the masonry, along which the drill 3 is now guided in a straight line or in a curve, the drill cuts into the material to the same depth all the time. By reason of technical considerations relating to friction, the drill edge 10 lies somewhat lower than the guiding head 6. The drill itself is constructed as a normal edge drill and is provided with hard metal edges which are held by a drill edge of elliptical cross section.

For the insertion of junction boxes or switches, circular openings are required. These circular openings are provided by the equipment described, the drill 3 being advanced or fed along the circumference of a circle about the center of a centering support or shank 11. This centering support 11 is screwed into the clamp or collar 8 on the side on which the handle is located, and is secured in its longitudinal position by means of a nut 13. At its front end, the support terminates in a cone 12, the point of which is pressed into the previously bored center hole for the cavity. Then, a ring is milled out by the drill 3 moving around in a circle, the cutting tool being kept perpendicular to the wall face during the whole of this movement.

In order to render it possible to bore rings of various diameters, the cone 12 is mounted eccentrically on its shank 11, so that the distance between the axis of the cone and the axis of the drill may be increased or decreased simply by revolving the cone 12 about the axis of its shank.

I claim:

An apparatus for making cavities for pipes and electric wiring in masonry, comprising, in combination, a hand drilling machine having a handle adapted to be grasped by a workman and a rotary cutter adapted to form a groove in a wall when the drilling machine is guided manually over the wall with the cutter applied to the wall at an angle thereto, a guiding member connected to the drilling machine at an angle to the axis of rotation of the cutter for sliding movement in the groove formed by the cutter, so as to guide the cutter in the right path and at the right depth and inclination during the formation of the groove, after an initial portion of the groove has been cut to receive said guiding member, a clamping member on said guiding member secured to the drilling machine in proximity to the cutter and extending on both sides of the cutter, a handle on the clamping member on the side of the cutter opposite to the guiding member, for enabling the apparatus to be guided over the wall during the operation of the cutter, a centering support adapted to be attached to the clamping member on the same side as the handle thereon so as to extend parallel to the axis of rotation of the cutter, said centering support including a shank having a screw thread for engagement with the clamping member, and a cone end for insertion in a bored hole in the wall to enable circular switch cavities to be formed by causing the drilling machine to be displaced around said bored hole with the axis of rotation of the cutter perpendicular to the wall face, said cone end having its axis eccentric with respect to the axis of the shank to enable larger or smaller wall cavities to be bored by varying the distance of the axis of the cone end from the axis of rotation of the cutter.

References Cited in the file of this patent

UNITED STATES PATENTS

| Number | Name | Date |
|---|---|---|
| 313,577 | Cooper | Mar. 10, 1885 |
| 494,368 | Decker | Mar. 28, 1893 |
| 1,277,573 | Hanneborg | Sept. 3, 1918 |
| 1,386,103 | Funk | Aug. 2, 1921 |
| 1,768,318 | Harasimiak | June 24, 1930 |
| 1,923,159 | McLaren | Aug. 22, 1933 |
| 2,238,304 | Belanger | Apr. 15, 1941 |
| 2,560,352 | Kelsey | July 10, 1951 |
| 2,569,682 | Lewis | Oct. 2, 1951 |